United States Patent Office 3,266,886
Patented August 16, 1966

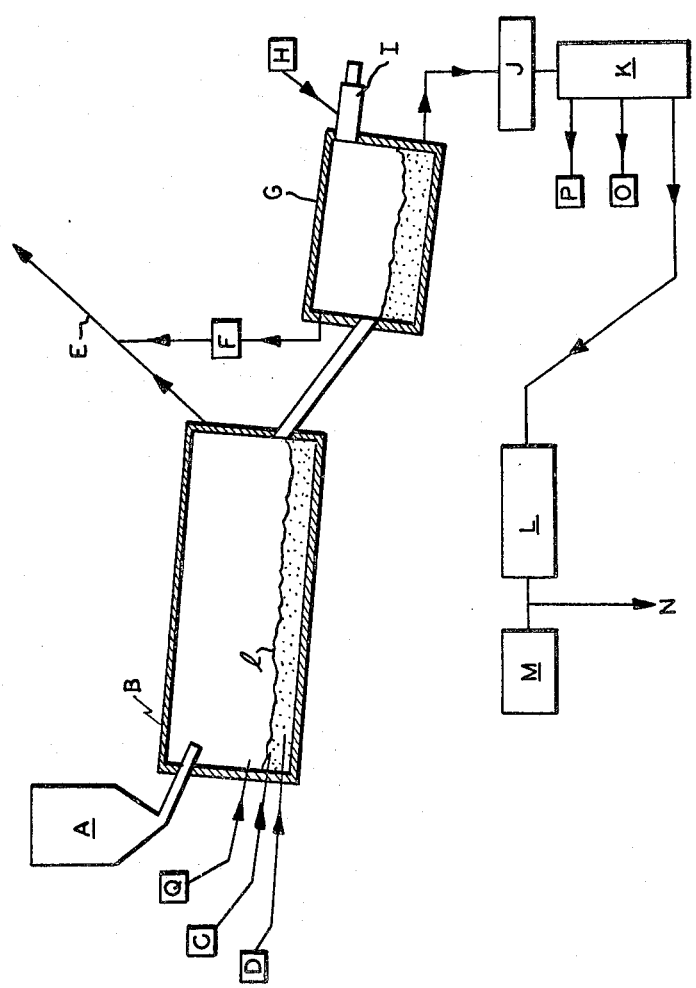

3,266,886
PHOSPHO-SILICATE AGGLOMERATION OF NON-NITROGENOUS FERTILIZERS AND RESULTANT PRODUCT
Arthur B. Middleton, Haddonfield, N.J., assignor to Philadelphia Quartz Company, Philadelphia, Pa., a corporation of Pennsylvania
Filed July 16, 1963, Ser. No. 295,437
12 Claims. (Cl. 71—64)

This invention relates to granulated non-nitrogenous fertilizers bound by the gelation of a soluble silicate bond with phosphoric acid and having a uniform particle size.

*Non-nitrogenous fertilizers.*—The composition of a fertilizer is usually stated as a series of numbers in which the first represents the percent by weight of available nitrogen, the second represents the percent by weight of available phosphate in terms of $P_2O_5$ and the third is percent by weight of available potash expressed as $K_2O$. Thus 0–20–20 indicates a fertilizer with no nitrogen, phosphorus components equivalent to 20 percent by weight of $P_2O_5$ and potash salts equivalent to 20 percent by weight of $K_2O$.

The phosphate component is ordinarily made up from a combination of superphosphate, triple superphosphate and phosphoric acid.

Ordinary superphosphate is produced by treating phosphate rock with sulfuric acid and the final product contains 18 to 21% of available phosphoric acid. Available phosphoric acid (APA) is determined as the amount of phosphoric acid, calculated as $P_2O_5$ which is soluble in water, plus the amount which is soluble in ammonium citrate according to a standard analytical procedure. TPA is the "total phosphoric acid" also calculated as $P_2O_5$. The superphosphate of the Davison Chemical Co., for instance, contains about 1.1% of water determined by the loss at 100° C. for five hours. The total phosphate (TPA) is 21.53% $P_2O_5$ and the available phosphate (APA) is 20.7% $P_2O_5$. Of this, the water soluble content is 17.4% $P_2O_5$ and the citrate soluble portion is 3.30.

Triple superphosphate, otherwise known as treble, double, or concentrated superphosphate, is variously quoted as being prepared in the range of 40 to 49 and 43 to 50% $P_2O_5$ as available phosphoric acid. It is prepared by treating phosphate rock with concentrated, normally 70–78%, phosphoric acid (51–56.5% $P_2O_5$).

The following is a representative distribution of particle size for commercial superphosphates:

| U.S. standard screen size, M: | Cumulative percent on screen |
|---|---|
| 4 | 1 |
| 6 | 2 |
| 20 | 31 |
| 35 | 51 |
| 100 | 83 |

Thus 50% or more is finer than the screen size range of 6–20 M normally desired for granulated products.

In the trade, $P_2O_5$ is referred to as phosphoric acid or phosphate. Crude phosphoric acid contains 53% $P_2O_5$. When prepared from the phosphate rock by the decantation process, the phosphoric acid contains 22–23% $P_2O_5$, whereas when prepared by the dihydrate process from gypsum the product contains 28–33% $P_2O_5$. It is concentrated to 45–55% $P_2O_5$. A 54.0% $P_2O_5$ acid contains 74.4% $H_3PO_4$ and 15% $H_2O$.

A 70–78% phosphoric acid ($H_3PO_4$) may be prepared by the wet process. Using the electric furnace process, 83% $H_3PO_4$ may be obtained. This is usually diluted to 78% (56.5% $P_2O_5$ and 22% $H_2O$) for use. Since a pure phosphoric acid contains only 72.4% $P_2O_5$, the usual concentrated phosphoric acid contains condensed phosphoric acid made by absorbing $P_2O_5$ vapor in hot acid.

The wet process phosphoric acid is much more impure as shown below:

|  | Wet Process | Furnace Process |
|---|---|---|
| $H_3PO_4$ | 74.4 | 78.0 |
| $P_2O_5$ | 54.0 | 56.5 |
| Dissolved impurities | 10.6 | (1) |
| $H_2O$ (available) | 15.0 | 22.0 |

[1] Practically none.

The dissolved impurities in wet process acid occur in approximately the following ranges:

|  | Percent |
|---|---|
| $Fe_2O_3$ | 0–4 |
| $Al_2O_3$ | 0–4 |
| $SO_3$ | 0.5–3 |
| CaO | 0–2 |
| MgO | 0–1 |
| F | 1–2 |

Silica is also present and the solution is usually black with carbon from organic impurities in the original rock bed.

Since all of these dissolved metal ions will react with soluble silicates, it is likely that, when wet process acid is used, some silicate is neutralized with the formation of iron, aluminum, calcium, or magnesium silicate as well as by the acid. More complex metal phospho silicates are also likely to form and no doubt a phospho silicate bond plays a part in the unexpected improvements found by using my process.

Potash is usually present as potassium chloride or muriate of potash. The usual commercial muriate of potash contains 60–62% of potash calculated as $K_2O$. The muriate of potash from Carlsbad is usually 60–61% $K_2O$ and from Searles Lake, that is the 62% crystallized muriate of potash, ranges from 62 to 62.5% $K_2O$. Chemical grade, that is 100% KCl, is 63.1% $K_2O$.

A "unit of nutrient" is equal to 1% of 1 ton or 20 lbs. of material. A 2% overage of phosphoric acid and potash is added to take care of any shrinkage losses, and to guarantee the correct analysis.

A batch of mixed fertilizer is usually set up on a pounds per ton basis shown below for a 0–20–20 product:

| Ingredients | Pounds | Analysis of raw ingredient | Formula Composition, Percent | | |
|---|---|---|---|---|---|
| | | | APA | $K_2O$ | $H_2O$ |
| Triple Superphosphate | 570 | 46.0 APA = Percent $P_2O_5$ in the superphosphate. | 13.11 | | 1.28 |
| Superphosphate | 730 | 20.0 APA | 7.30 | | 2.37 |
| Muriate of Potash | 680 | 60.0 $K_2O$ | | 20.4 | |
| Total | [1] 2,000 | | 20.41 | 20.4 | 3.65 |

[1] To make up the ton, 20 lbs. of hydrated lime might be added.

A PROBLEM WITH FERTILIZERS

The granulation of fertilizers into uniform particle size products has become necessary. Manufacturers are subject to a penalty if a spot check analysis of their products does not conform to a standard. Where the product has a wide variation in particle size, segregation is bound to occur and it is almost impossible to avoid penalties as a result of the spot check. Furthermore, the increasingly widespread practice of applying fertilizer as a dry granulated product by custom-truck places a premium on products which maintain their free-flowing characteristics and absolutely uniform concentration of ingredients. Thus it is necessary to avoid products which cake or become sticky, on the one hand, or products which are dusty and brittle, on the other.

PRIOR ATTEMPTS TO SOLVE THE PROBLEM

A number of methods of granulating fertilizers are well known. The non-nitrogen containing fertilizers, as compared to the nitrogenous fertilizers, have too little liquid phase and normally contribute no heat of reaction in the granulating process. Therefore, they must be granulated by a different procedure. In general, it is known to attempt to granulate these products by the addition of steam, an agglomeration step and drying and cooling, or by the addition of from 10 to 16% of hot water based on the dry solids, followed by agglomeration and drying and cooling. Thirdly, the TVA has developed an in-situ reaction of finely ground rock phosphate with either phosphoric acid or sulfuric acid and steam with an agglomeration step followed by drying and cooling. A fourth procedure is to blend coarse or granular superphosphates and potassium sulfate in bulk. In general, all of these methods give a mediocre product. While the method proposed by TVA was demonstrated successfully by them, in plant practice it often has been found that problems develop which are difficult to overcome. By the bulk blending process it is virtually impossible to obtain satisfactory uniformity.

Various attempts have also been made to granulate these and similar solids by the addition of sodium silicate solutions, but in the case of non-nitrogen fertilizer products these have not been commercially successful. In general, when plain water is used as the agglomerating agent, it is found that not all of the potash is taken up in the agglomerates, whereas if the sodium silicate is used alone the particles tend to agglomerate into oversize lumps which are hard and must be ground with further development of dust.

THE PRESENT INVENTION

Considered from one aspect, the present invention involves a process for the agglomeration of non-nitrogenous fertilizers which comprises:
 (a) wetting the fertilizer component particles with a soluble silicate solution,
 (b) treating the wetted particles with phosphoric acid,
 (c) drying to a water content of about 0.5 to 5.0%, and
 (d) recovering a product which has a screen cumlative percent no lower than about 90% on 35 mesh and no more than 15% on 6 mesh.

According to my invention the components of the non-nitrogenous fertilizer are first treated with sodium silicate solution, whereby the surfaces of the fertilizer component are coated, and then treated with phosphoric acid whereby a gelatinous bond is developed which maintains the agglomerates in the desired size range.

In my process the agglomerating reagent is a soluble silicate solution having a range of $SiO_2$ to alkali oxide ratio of from 2.0 to 4.0 with a concentration range of $SiO_2$ from about 1 to 40%. The soluble silicate is added in an amount equal to about 1 to 4% of the dry weight of the fertilizer components. Water may be added with the soluble silicate or as a separate spray.

The phosphoric acid is used as an aqueous solution containing from about 35 to 83% phosphoric acid and may be added in an amount equivalent to from 200 to 500% of the alkali in the soluble silicate.

The proper drying schedule is an important part of my process. In general, I recommend heating the product to an exit temperature between 215° F. (102° C.) and 275° F. (135° C.) (and preferably 250° F.) in order to rapidly reduce the final water content of the product to between 0.50 and 5.0% but preferably between 1 and 2% $H_2O$. If the water content is too low, the particles tend to be too hard and slow to dissolve while if too much water remains, they are sticky and soft and pour poorly, and form massive cakes.

ADVANTAGES OF PRESENT INVENTION

By the use of this process, 25% less water is needed than if the agglomeration is accomplished with water alone and 15% less than if sodium silicate solution alone is used as the agglomerating agent. Thus less heat and drying time is required, and the product of the agglomerating step consists of 80% or more in the desired size range, for instance 6 to 20 mesh. This product exhibits little or no segregation according to particle size or composition; that is, there is a very uniform distribution of the fertilizer components. It is also to be noted that by the use of the phosphoric acid the phosphate content of the fertilizer is enhanced or a higher proportion of superphosphate may be included in the formula. The addition of the silicate aids in the availability of the phosphate as a fertilizer and also is effective in helping to develop preferred soil structures or aggregates which permit access of air and hold moisture. Since the fines are all bound into these uniform size particles, there is no problem with dusting and the fertilizer components are uniformly distributed over the field by standard spreading equipment.

*The examples in general.*—In the following examples I have used these materials:

| Sodium Silicate | Ratio percent $Na_2O$: percent $SiO_2$ by weight | (Weight percent) $Na_2O$ | Weight per gallon, lbs. |
|---|---|---|---|
| "N" (Philadelphia Quartz Co.) | 1:3.22 | 8.90 | 11.6 |
| "K" (Philadelphia Quartz Co.) | 1:2.9 | 11.00 | 11.7 |

20% standard superphosphate—Standard particle size (Dow Chemical Co., Davison Chemical Co., American Agricultural Chemical Co., or Mathieson Chemical Corp.).
Standard triple superphosphate—Standard particle size (United States Phosphoric Products Division, Tennessee Corp.).
Phosphoric acid 73% (56% $P_2O_5$).
Muriate of potash—Standard particle size (KCl) (Screen size 7% on 20 M and 85% on 65 M).

Screen test were made with Tyler screens and all of the fines were included in the product by blocking off the return outlet for fines in the classifier.

Example 1

A 1500 lb. batch of mixed standard muriate of potash, standard superphosphate and standard triple superphosphate had a ratio of 0 N–15 $P_2O_5$–30 $K_2O$. To this batch were added 10 gallons of water and 30 lbs. of "N" sodium silicate without neutralization. The product was passed through a dryer and the product exit temperature was maintained at about 212° F. in order to dry without boiling the sodium silicate. When the 30 lbs. of "N" sodium silicate was used (which amounts to a rate of 40 lbs. per ton) the granulation was significant, but at a rate of 80 lbs. per ton, the granulation was much better. However, since the lumps tended to grow too large and to become very hard at a rate of 80 lbs. per ton, it was evident that the product was unsatisfactory and no screen tests were made.

Example 2

To the same batch composition as set forth in Example 1, 30 lbs. of "N" sodium silicate were added with 10 gallons of water, as before, and in addition 5.25 lbs. of phosphoric acid (56% $P_2O_5$) equivalent to 214% of the $Na_2O$ in the "N" sodium silicate. Since the product was somewhat sticky, the phosphoric acid addition was raised to a total of 9.75 lbs. This was 396% of the acid equivalent to the sodium silicate. This gave a better but still somewhat damp product and, therefore, the water addition was decreased to 8 gallons and the temperature raised so that the product at the exit had a temperature of 250° F. and a water content of about 1% $H_2O$.

The batch used in this example, on a tonnage basis, was as follows:

| Ingredients | Pounds | Analysis Basis | Nutrient Units | | $H_2O$ Units |
|---|---|---|---|---|---|
| | | | APA | $K_2O$ | |
| Phosphoric Acid | 13 | 54.0 APA | 0.27 | | 0.08 |
| Triple Superphosphate, Standard (Davison Chemical Co.) | 430 | 47.6 APA | 10.23 | | 0.86 |
| Superphosphate, Standard (United States Phosphoric Division) | 512 | 20.2 APA | 5.17 | | 1.54 |
| Muriate of Potash, Standard | 1,012 | 60.5 $K_2O$ | | 30.61 | |
| Sodium Silicate, "N" (396% neutralized by acid) | 40 | | | | 1.24 |
| Total | 2,007 | | 15.67 | 30.61 | 3.72 |

The Tyler screen cumulative percent was 78.1% on 20 mesh and 97.2% on 35 mesh with only 5.2% on 6 mesh. In contrast, when water alone was employed for agglomeration only 52% was held on 20 M and 88% was retained on 35 mesh.

*Example 3*

In this example a 1500 lb. batch of a mixed fertilizer having a proportion of 15 parts of $P_2O_5$ to 30 parts of $K_2O$ was made up using the Dow Chemical Co. 20% superphosphate in the following proportions (on a ton basis):

| Ingredients | Pounds | Analysis Basis | Nutrient Units | | $H_2O$ Units |
|---|---|---|---|---|---|
| | | | APA | $K_2O$ | |
| Phosphoric Acid | 13 | 54.0 APA | 0.35 | | 0.10 |
| Triple Superphosphate, Standard (U.S. Phosphoric Division) | 407 | 47.6 APA | 9.69 | | 0.81 |
| Superphosphate, Standard (Mathieson & Baugh Chemical Co.) | 522 | 20.2 APA | 5.27 | | 1.57 |
| Muriate of Potash | 1,012 | 60.5 $K_2O$ | | 30.60 | |
| Sodium Silicate, "N" (315% neutralized by acid) | 50 | | | | 1.56 |
| Total | 2,004 | | 15.31 | 30.60 | 4.04 |

I also prepared a very similar batch with the exception that 45 lbs. of sodium silicate "K" (315% neutralization) were substituted for the "N" sodium silicate to demonstrate that any liquid soluble silicate may be used. In both cases 8 gals. of water were added to the 1500 lb. batch. Even though the superphosphate used was "run of the pile" with many fine particles, both products were satisfactory and had a moisture content of about 1%. The low total on the 20 M. screen could have been increased by adjustment of the operating conditions, as shown in Example 4. In general, it was concluded that a phosphoric acid ratio of 1 lb. of phosphoric acid to 3 lbs. of sodium silicate was about optimum. This is equivalent to 410% neutralization of "N" and 368% of "K." The product, using the "N" sodium silicate, had a final analysis of 15.74 TPA, 15.5 APA and 30.27 $K_2O$. The cumulative percent on the Tyler screen was 4.9% on the 6 mesh screen and 90.4% on the 35 mesh screen. With "K," the final analysis was 15.40% TPA, 15.22% APA and 31.59% $K_2O$ with 3.4% on the 6 mesh screen and 89.4 on the 35 mesh screen.

There was very little segregation in the pile of product for samples taken from a classifier had a cumulative percentage retained on the 7 mesh screen of about 4% in each case, while on the 35 mesh screen, the sample taken from the classifier showed 94% (cumulative) and the sample taken from bags showed 96% (cumulative).

*Example 4*

A further test of a 0-15-30 type fertilizer mixture shown in the table in Example 3 was prepared in which only 40 lbs. of "N" were used with 13 lbs. of $H_3PO_4$ on a tonnage basis (405% neutralization) and 8 gals. of water were used with the 1500 lb. batch made up using Davison Chemical Company's 20% standard superphosphate. In other words, the batch was just as in Example 3 with these changes. The chemical analysis taken as composite mixing samples from varying levels along accentuated slopes of a pile and from bags indicated remarkably uniform analysis adequately meeting guarantees when formulated with a 2% nutrient overage.

A sample taken from the classifier was found to hold 97.5% on the 35 mesh screen, 85% on the 20 mesh screen and 8% on the 6 mesh screen.

*Example 5*

In this test a 0-10-30 fertilizer was agglomerated in a continuous fashion using a gear pump to feed the "N" silicate at the rate of 40 lbs. of "N" per ton of mixed fertilizer. The fertilizer itself, having the composition below, was run through at the rate of 12 tons per hour.

| Ingredients | Pounds | Analysis Basis | Nutrient Units | | $H_2O$ Units |
|---|---|---|---|---|---|
| | | | APA | $K_2O$ | |
| Phosphoric acid | 14 | 54.0 APA | 0.38 | | 0.11 |
| Triple Superphosphate | 54 | 46.5 APA | 1.25 | | 0.10 |
| Superphosphate | 894 | 19.2 APA | 8.58 | | 3.58 |
| Muriate of Potash | 1,012 | 60.5 $K_2O$ | | 30.61 | |
| Sodium Silicate | 40 | | | | 1.20 |
| Total | 2,014 | | 10.21 | 30.61 | 4.99 |

Six gallons of water were used for each ton and 14 lbs. of phosphoric acid (56% $P_2O_5$) were added following the mixing of the silicate, making a neutralization equivalent of 430%. The water was added as a spray on the feed and the silicate and acid solutions were added to the bottom of the mixing unit. The potassium chloride (muriate of potash) had a screen sizing with 41% accumulated on a 35 mesh screen. AACC normal (20% standard) superphosphate was used, and a total of 60 tons of product was made. As before, the classification screen was masked so that the fines were carried into the product and tests of the comprising mixing sample and 3 bags of product showed very uniform sizing and analysis.

The attached figure shows a generalized diagram for this continuous treatment. "A" refers to a container of the triple superphosphate and muriate of potash in the proper proportion for the grade of fertilizer planned. "B" is a TVA ammoniator used as a continuous granulator. The rippled line "1" shows the approximate level of the granules. Water is sprayed into the granulator at "Q" or with the sodium silicate at "C," and "D" represents the source of phosphoric acid added to the bottom of the granulator so that the phosphoric acid is added to granules coated with soluble silicate solution. Air is exhausted through "E" and the solid product is carried from the granulator "B" to dryer "G." Dryer "G" is heated by burner "I," and air "H" is passed through the burner and heated and then passed through the dryer to remove water from the treated granules. The air then passes through the air-filter "F" to remove any fines and dust, and is then exhausted along with the rest of the air at "E." The dried product which usually contains about 1% of $H_2O$ is passed from the dryer "G" to the cooler "J" and from the said cooler into the classifier "K." There is an outlet "P" from the classifier for fines which would ordinarily be returned to "A" but, in this case, the port for the lines was cut off. Oversize material will pass to the grinder at "O" and the remainder goes to cooler "L." From "L" the final product passes to the storage bin "M" and a sample may be removed from the sampler "N."

*Example 6*

In this case a 0–20$P_2O_5$–20$K_2O$ fertilizer was prepared from triple superphosphate and muriate of potash in the following proportions:

| Material | Pounds | Percent available phosphoric acid | Percent K | Percent water |
|---|---|---|---|---|
| Superphosphate | 864 | 20 | | 5.0 |
| Triple superphosphate | 476 | 46.2 | | 6.0 |
| Phosphoric acid | 14 | 52.5 | | 19.5 |
| Potash (KCl) | 662 | | 60.5 | 0.2 |
| "N" sodium silicate (428% neutralized) | 40 | | | 62.0 |
| | 2,056 | | | |

Sodium silicate was used at the rate of 2% by weight with 428% neutralization from 14 lbs. phosphoric acid and 12 gallons of water per ton in order to achieve optimum granulation. 500 tons of a good product were obtained. The final moisture and screen sizing of the product follows. Sample I was run at 10 tons per hour using a mixture of standard and coarse potash while II was run at 11.8 tons per hour with coarse potash.

| | Cumulative percent | |
|---|---|---|
| | Sample No. I | Sample No. II |
| Tyler screen size: | | |
| +6 | 0.9 | 1.1 |
| +7 | 3.2 | 4.6 |
| +10 | 34.0 | 39.0 |
| +14 | 73.7 | 81.7 |
| +16 | 90.3 | 96.0 |
| +20 | 95.8 | 99.1 |
| +35 | 98.4 | 99.8 |
| $H_2O$—Oven, 5 hrs. at 100° C | 2.14 | 1.79 |

*Example 7*

A series of tests were carried out in a rotary drum to compare the effect of (1) water, (2) water and soluble silicate, and (3) water, soluble silicate and phosphoric acid, on the agglomeration of standard 0–15–30 fertilizer mixture. The original components had a size distribution of 20% on each screen interval 10–20, 20–35, 35–65, 65–150, and 150–270 M.

Nearly optimum water was added prior to placing the composition in the drying drum, and additional water was sprayed in if necessary. In (2) and (3), the other ingredients were also added before charging the drum which was preheated to 105° C. and all the batches were put through a 5 mesh screen before charging. The added charge cooled the drum which was heated back to 80° C. before additional water was sprayed in and the temperature of the batch was controlled to remain below 90° C.

The following tables show the compositions used. The water required by (3) was about 25% less than needed for (1), and (2) needed about 10% less than (1).

1. 0-15-30

| Ingredients | Pounds | Analysis Basis, percent | Units APA | Units $K_2O$ | Units $H_2O$ |
|---|---|---|---|---|---|
| Triple superphosphate | 399 | 48.9 APA | 9.73 | | 0.10 |
| Ordinary superphosphate | 545 | 20.5 APA | 5.58 | | 0.11 |
| Potassium chloride | 1,014 | 60.5 $K_2O$ | | 30.61 | |
| Concentrated borate | 46 | 20.2 B | | | |
| | 2,004 | | 15.31 | 30.61 | 0.21 |

2. 0-15-30 WITH SODIUM SILICATE

| Ingredients | Pounds | Analysis Basis, percent | Units APA | Units $K_2O$ | Units $H_2O$ |
|---|---|---|---|---|---|
| Triple Superphosphate | 428 | 48.9 APA | 10.44 | | 0.10 |
| Ordinary superphosphate | 476 | 20.5 APA | 4.87 | | 0.10 |
| Potassium chloride | 1,014 | 60.5 $K_2O$ | | 30.61 | |
| Concentrated borate | 46 | 20.2 B | | | |
| Sodium silicate (N) | 40 | 8.9 $Na_2O$ | | | 1.25 |
| | | 28.7 $SiO_2$ | | | |
| | 2,004 | | 15.31 | 30.61 | 1.45 |

3. 0–15–30 WITH SODIUM SILICATE AND PHOSPHORIC ACID

| | | | | | |
|---|---|---|---|---|---|
| Phosphoric acid | 13 | 56.0 APA | 0.36 | | 0.15 |
| Triple superphosphate | 412 | 48.9 APA | 10.05 | | 0.10 |
| Ordinary superphosphate | 480 | 20.5 APA | 4.90 | | 0.10 |
| Potassium chloride | 1,016 | 60.5 K$_2$O | | 30.61 | |
| Concentrated borate | 46 | 20.2 B | | | |
| Sodium silicate (N) | 40 | 8.9 Na$_2$O | | | 1.25 |
| | | 28.7 SiO$_2$ | | | |
| | 2,007 | | 15.31 | 30.61 | 1.60 |

The product of (1) had a wide particle size range and it was evident that much of the potash did not agglomerate. The product of (2) increased the agglomerate size over (1) and had less of the desired 6–20 M range. Increasing the soluble silicate did not help. Section (3) showed that a more desirable size range was obtained by adding the H$_3$PO$_4$ following the water and soluble silicate. Thus the 6–20 M section in (1) was only 46.1% in (2) it was 41.5% and in (3) 84.4%. In one test of (3) as much as 90% was held on the 14 M screen. Analysis demonstrated uniform distribution of nutrients and a test of granule hardness showed the product (3) to advantage. The average weight in pounds to crush 100 granules (6–8 M) was 4.2 for (3) and only 2.9 for (1) and 1.8 for (2).

Example 8

In this example 68 tons of 0–20–0 fertilizer as run-of-the-pile 20% superphosphate from Baugh Chemical Co. containing excess unreacted phosphoric acid was granulated at a rate of 25 tons per hour in a rotating drum ammoniator using about 3% added "N" sodium silicate and about 1% added water and steam based on the weight of the superphosphate. Silicate was added through a spray head on top of the batch while the water and steam were added through the sparging lines below but ahead of the silicate.

The granulation was greatly improved with a much higher proportion in the 6 to 20 mesh range and little or no fines.

In this example the amount of free phosphoric acid present was sufficient to neutralize the sodium silicate at least about 200%.

*Conclusions.*—From these tests it was concluded that the treatment of the non-nitrogenous fertilizer mixture with a liquid sodium silicate, such as "N," followed by the addition of phosphoric acid in suitable proportions, forms a gel which favors the granulation of such standard solid fertilizer ingredients. From the point of view of agglomeration and cost, the optimum proportion of the "N" sodium silicate is about 40 lbs. per ton of fertilizer. The ratio of the soluble silicate to phosphoric acid appears to be important. For 40 lbs. of the "N" sodium silicate, 430% neutralization from 15 lbs. of 75% phosphoric acid is approximately optimum.

Furthermore, the total moisture content in the mixer should be approximately 8 to 10%, and water and soluble silicates should be added to the solid ingredients in the mixer in advance of the phosphoric acid. Any of the ordinary siliceous soluble silicates is satisfactory as long as it is properly balanced with the phosphoric acid and the amount of moisture. The cost of the added silicate, additional electricity, and additional oil is largely offset by the lower cost of the standard ingredients used and the reduced number of ingredients which is necessary to hold in inventory. A final product moisture of about 1% is usually desirable to maintain the stability of the granules. It is not necessary to use granulated muriate of potash as even a fine type, such as one which retains only 41% on the 35 mesh screen, is satisfactory and does not require recycling of the fines. Most importantly, non-nitrogenous grades of fertilizer having uniform chemical analysis can be produced and shipped.

What is claimed is:

1. A process for the agglomeration of fertilizer particles containing phosphate components, potash components and non-nitrogen components which comprises:
    (a) wetting said fertilizer particles containing phosphate components, potash components and non-nitrogen components with a soluble alkaline silicate solution,
    (b) treating the wetted particles with phosphoric acid,
    (c) drying the thus treated fertilizer to a water content of about 0.5 to 5.0% and
    (d) recovering a fertilizer product which has a screen cumulative percent no lower than about 90% on 35 mesh and no more than 15% on 6 mesh.

2. A process according to claim 1 wherein the silicate solution is added to the fertilizing composition in an amount between about 1% and 4% based upon the dry weight of the fertilizer.

3. A process according to claim 1 wherein the phosphoric acid is used as an aqueous solution containing from 35 to 83% phosphoric acid and is added in an amount equivalent to from 200 to 500% based on the weight required to neutralize the soluble silicate.

4. A process for the agglomeration of finely divided particles which comprises:
    (a) wetting the finely divided particles with 1–4% by weight of a soluble alkaline silicate solution,
    (b) treating the thus wetted particles with phosphoric acid in an amount equivalent to from 200 to 500% based on the weight required to neutralize the alkaline silicate,
    (c) drying the thus treated particles to a water content of about 0.5 to 5.0% and
    (d) recovering a product which has a screen cumulative percent no lower than about 90% on 35 mesh and no more than 15% on 6 mesh.

5. A process for the agglomeration of fertilizer particles containing phosphate components, potash components and substantially free of nitrogen components which comprises:
    (a) wetting said fertilizer particles with a soluble sodium silicate solution, wherein the ratio of the soluble silicate ranges from about 2 to 4 SiO$_2$:Na$_2$O and the silica concentration in the solution ranges from about 1 to 4%, said silicate solution being added to the fertilizer in an amount between about 1% and 4% based upon the dry weight of the fertilizer,
    (b) treating the thus wetted particles with phosphoric acid, said phosphoric acid being used as an aqueous solution containing from 35 to 83% phosphoric acid and is added in an amount equivalent to from 200 to 500% based on the weight required to neutralize the sodium silicate.
    (c) drying the thus treated fertilizer to a water content of about 0.5 to 5.0% and
    (d) recovering a fertilizer product which has a screen cumulative percent no lower than about 90% on 35 mesh and no more than 15% on 6 mesh.

6. A process according to claim 5 wherein the sodium silicate solution is added to the fertilizer particles in an amount of about 40 lbs. per ton of fertilizer.

7. A process according to claim 5 wherein about 14 lbs. of 75% phosphoric acid per ton of fertilizer is employed.

8. A process for the agglomeration of a batch of fertilizer particles consisting of mixed standard muriate of potash, standard superphosphate and standard triple superphosphate which comprises:

(a) wetting said batch of fertilizer particles consisting of mixed standard muriate of potash, standard superphosphate and standard triple superphosphate with a soluble alkali silicate solution,
(b) treating the wetted particles with phosphoric acid,
(c) drying the thus treated fertilizer to a water content of about 0.5 to 5.0% and
(d) recovering a fertilizer product which has a screen cumulative percent no lower than about 90% on 35 mesh and no more than 15% on 6 mesh.

9. A process according to claim 8 wherein the silicate solution is added to the fertilizing composition in an amout between about 1% and 4% based upon the dry weight of the fertilizer.

10. A process according to claim 8 wherein the phosphoric acid is used as an aqueous solution containing from 35 to 83% phosphoric acid and is added in an amount equivalent from 200 to 500% based on the weight required to neutralize the soluble silicate.

11. A fertilizer product having a water content of between 0.5 and 5.0%, a screen cumulative percent of no lower than about 90% on 35 mesh and no more than 15% on 6 mesh, and consisting of fertilizer particles agglomerated together by phospho-silicate bonds consisting of the reaction product of a soluble alkaline silicate and phosphoric acid, said fertilizer particles containing phosphate components, potash components and substantially free of nitrogen components.

12. A fertilizer product having a water content of between 0.5 and 5.0%, a screen cumulative percent of no lower than about 90% on 35 mesh and no more than 15% on 6 mesh, and consisting of fertilizer particles agglomerated together by phospho-silicate bonds consisting of the reaction product of a sodium silicate and phosphoric acid, said fertilizer particles consisting of a mixture of standard muriate of potash, standard superphosphate and standard triple superphosphate.

References Cited by the Examiner
UNITED STATES PATENTS

| 847,749 | 3/1907 | Ellis | 71—64 |
| 2,008,469 | 7/1935 | Prince | 71—64 |
| 2,136,793 | 11/1938 | Gabeler et al. | 71—64 |
| 2,287,759 | 6/1942 | Hardesty et al. | 71—40 |

DONALL H. SYLVESTER, *Primary Examiner.*
ANTHONY SCIAMANNA, *Examiner.*